N. H. HUNT.
MEANS FOR MEASURING THE VELOCITY OF A MOVING BODY.
APPLICATION FILED JULY 9, 1918.
1,352,809.
Patented Sept. 14, 1920.
4 SHEETS—SHEET 4.
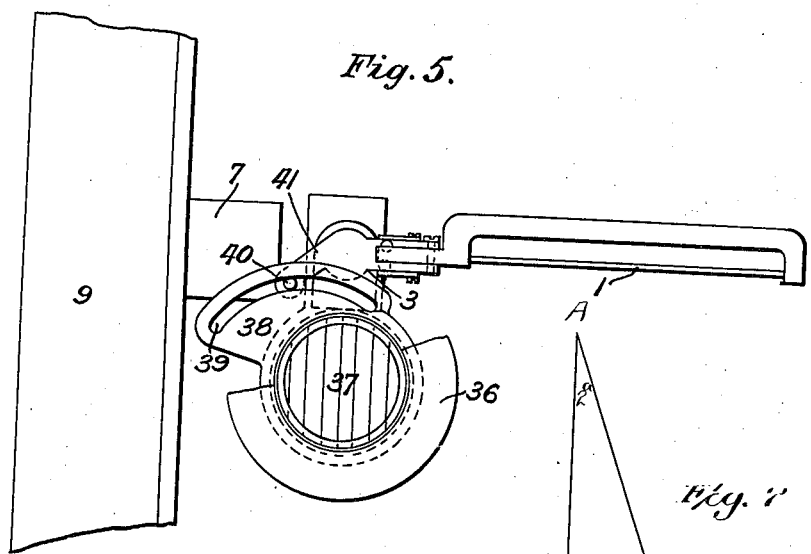
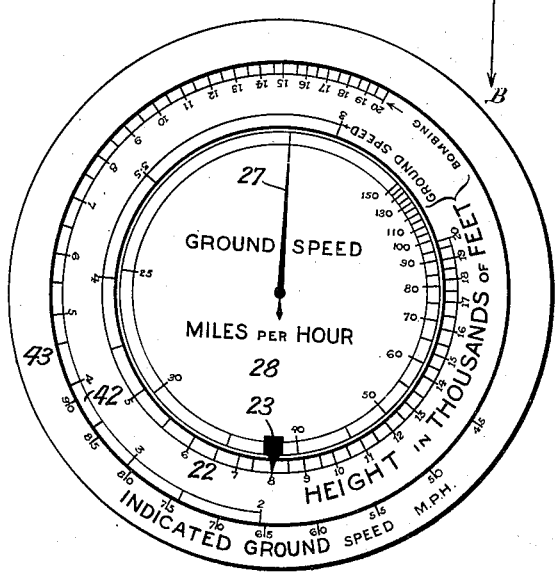

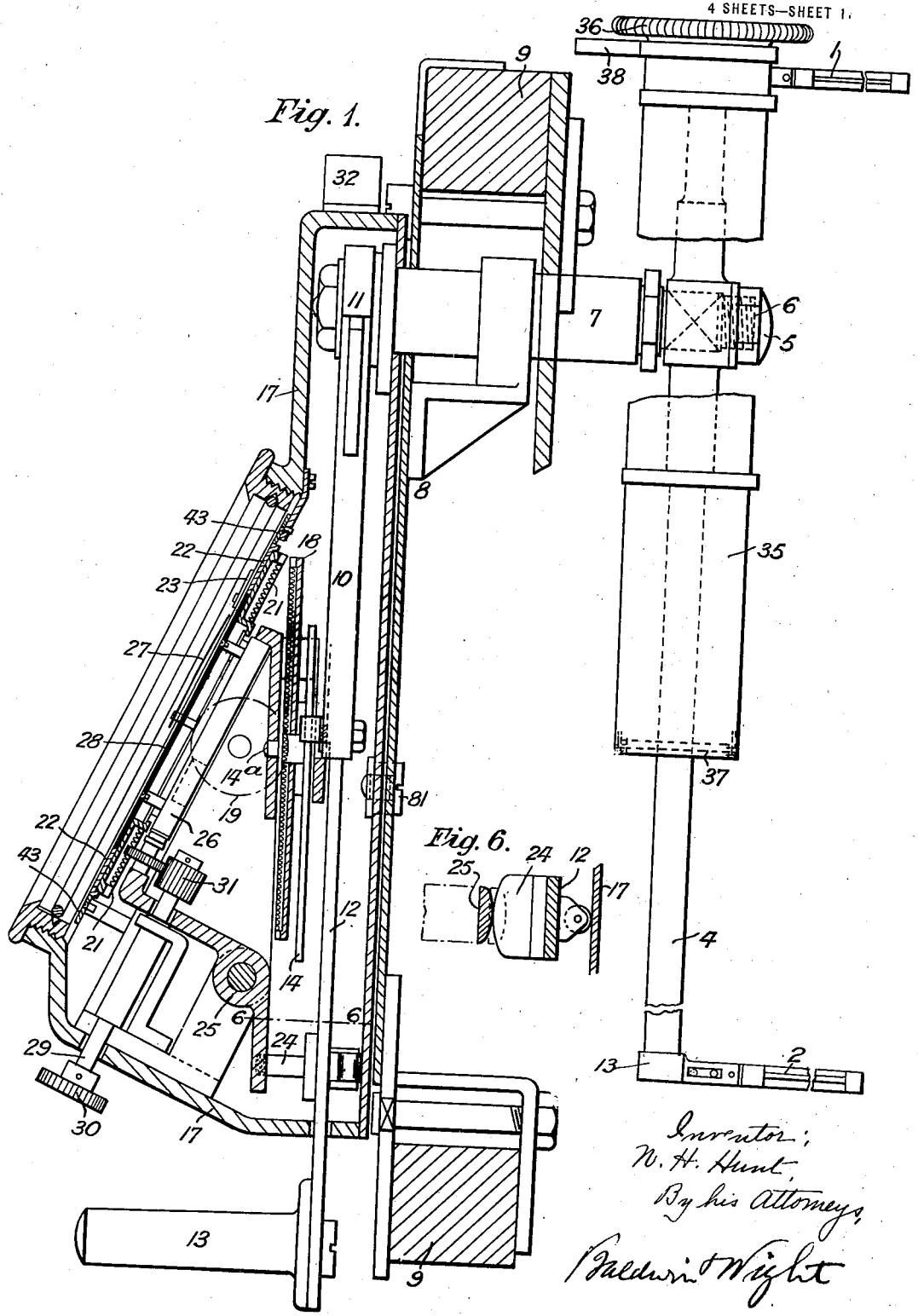

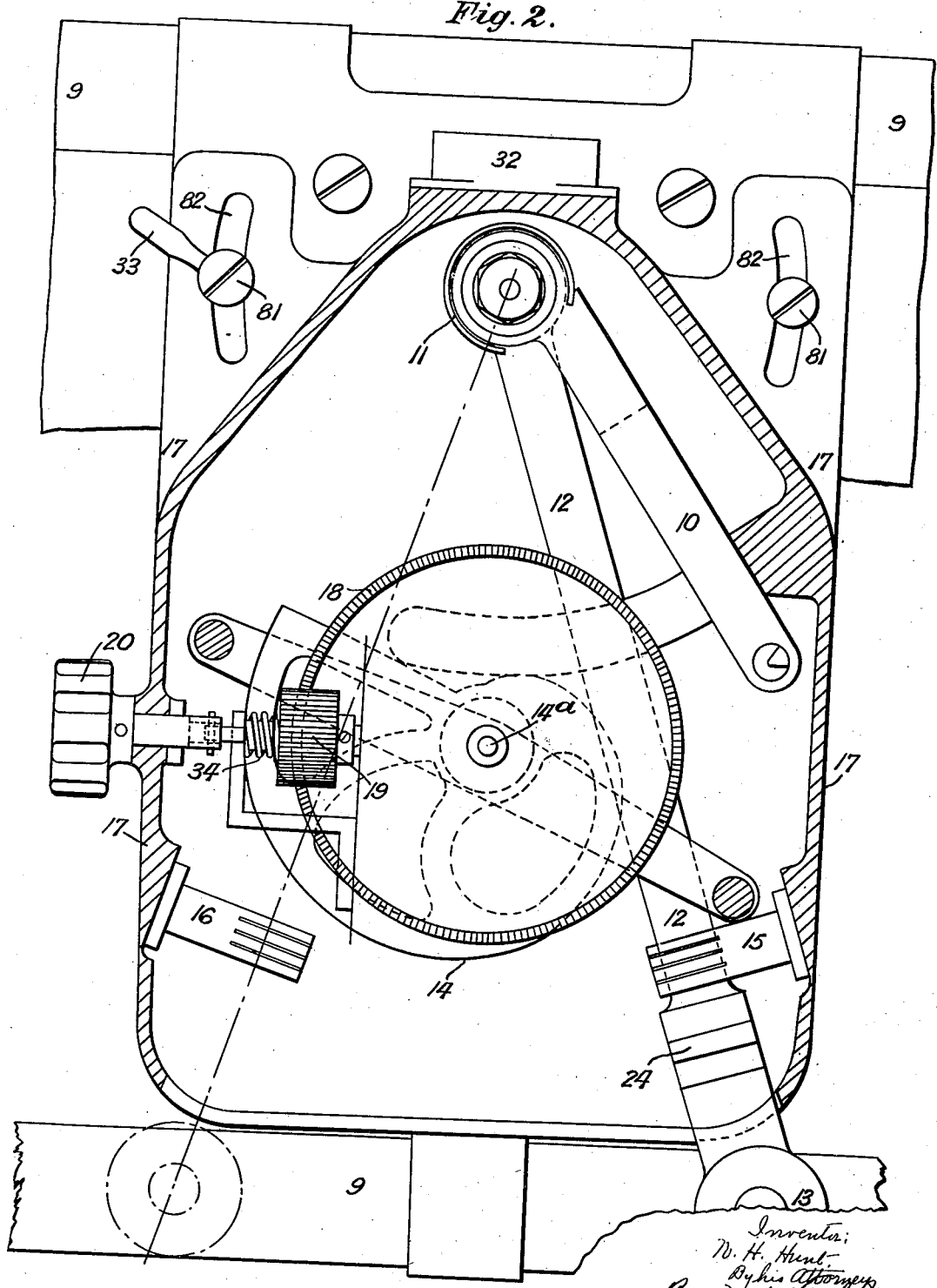

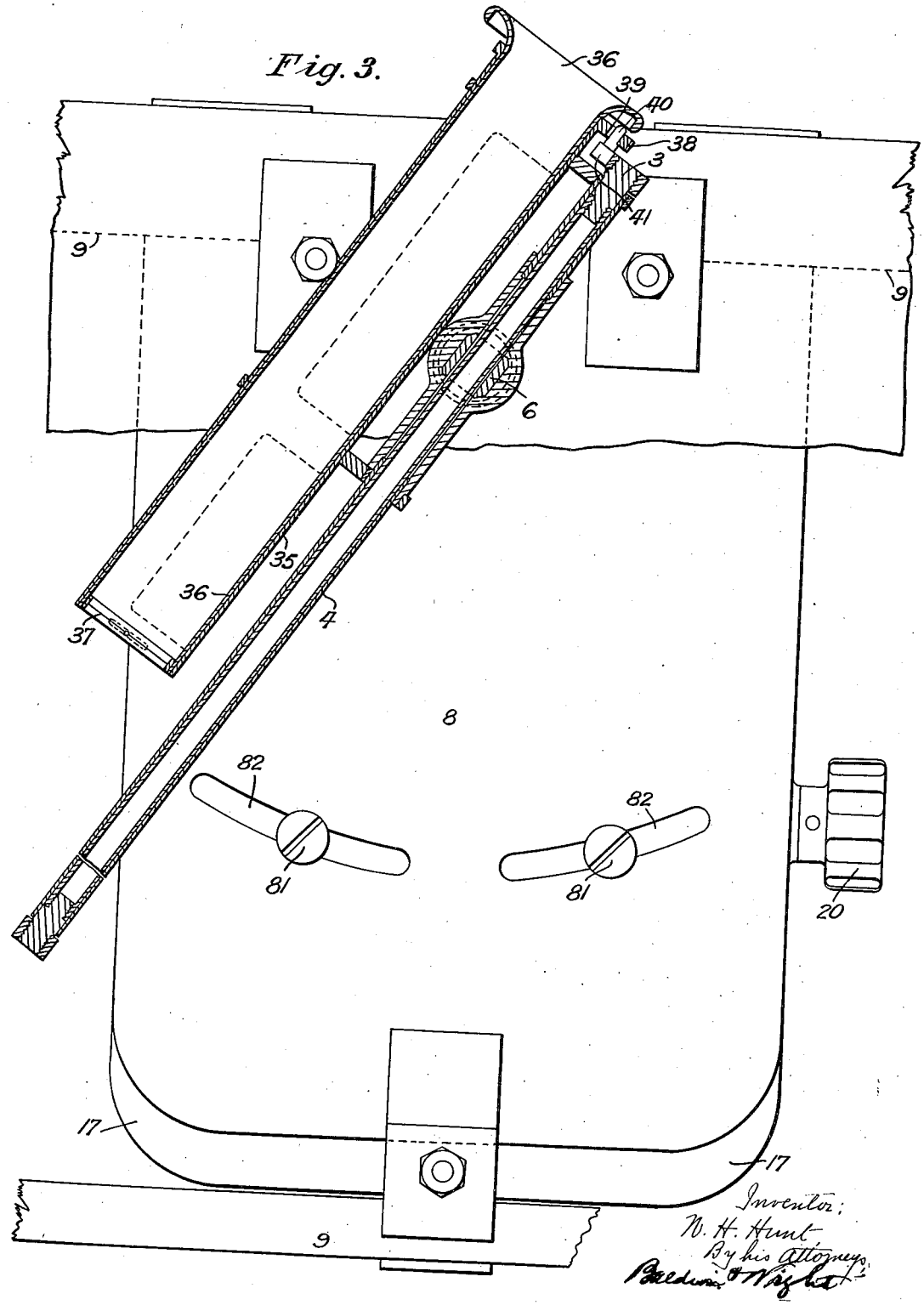

UNITED STATES PATENT OFFICE.

NATHANIEL HARVEY HUNT, OF LONDON, ENGLAND, ASSIGNOR OF ONE-HALF TO WALTER GEORGE KENT, OF LONDON, ENGLAND.

MEANS FOR MEASURING THE VELOCITY OF A MOVING BODY.

1,352,809.  Specification of Letters Patent.  Patented Sept. 14, 1920.

Application filed July 9, 1918. Serial No. 244,065.

*To all whom it may concern:*

Be it known that I, NATHANIEL HARVEY HUNT, a subject of the King of Great Britain, residing at 199 High Holborn, London, England, have invented new and useful Improved Means for Measuring the Velocity of a Moving Body, of which the following is a specification.

The object of this invention is to provide means for indicating the speed of a moving body and it is especially applicable for indicating the speed of an aircraft either to a person in the aircraft, or to an observer on the ground. It may, however, be used to determine the speed of a distant ship, or to determine the relative speed of two moving bodies from one of the bodies, and in conjunction with the dropping of bombs and articles, such as mail bags, packages and the like, at predetermined places.

According to this invention I so mount a sight bar that it is movable about an axis between a fixed stop and an adjustable stop, and I provide means whereby as the bar is moved from one position to the other a stop-watch or other timing mechanism is started or stopped. The adjustable stop is set according to the distance or a previously computed angle; that is, to the altitude of the aircraft, to the range of the ship, or to the correct angle for observing a spot at the instant for releasing a bomb or the like which shall fall on to the observed spot. The adjustable stop is preferably formed of a cam, which can be rotated against a fixed pointer, and the bar is provided with a feeler adapted to rest upon the cam.

On to the sight bar is preferably fitted a sighting tube capable of being rotated and having wires fixed across the field of vision. In their normal position these wires are at right angles to the axis of the sight bar pivot. The sighting tube is geared to the sights fitted to the sight bar in such a manner that rotation of the tube rotates the sights on the sight bar. The ratio of the gearing is such that the position to which the sights on the sight bar are rotated gives the correct angular disposition of the sights for measuring the speed of objects moving in any direction other than at right angles to the axis of the sight bar, or for measuring the speed of an aeroplane when its longitudinal axis does not lie along the direction of motion; that is to say, the rotation of the tube automatically adjusts the sights so as to compensate for drift.

My invention is illustrated by the accompanying drawings, which show a ground speed indicator and bomb sight fitted to the fuselage of an aeroplane. Figure 1 is a vertical transverse section, Fig. 2 a vertical longitudinal section and Fig. 3 a side view partly in section. Fig. 4 shows the dial and surrounding scales and Fig. 5 shows a detail. Fig. 6 is a section on the line 6—6, Fig. 1. Fig. 7 is a diagram.

1 and 2 are the upper and lower sights carried by a sight bar 3 and hinged thereto so that they can be turned down and up out of the way when not in use. This bar is mounted in a tube 4 which can be secured by a nut 5 on to a square fork on the outer end of a spindle 6 carried in bearings 7 in a frame 8 which can be secured to the fuselage represented by 9; this spindle has fast upon it a feeler 10 connected through a C spring 11 to a lever 12 loose on the spindle 6 and fitted with a handle 13. 14 is an altitude cam mounted on a pivot 14ᵃ and which can be set as hereinafter described to the altitude at which the aeroplane is flying. 15 and 16 are spring jaws, one on each side of the casing 17 inclosing the mechanism. When an observation is made the lever 12 is moved by means of the handle 13 from the normal position in which it is shown in Fig. 2 to the position indicated by a dotted line in which it is caught and retained by the spring jaw 16, but while the angle through which the lever is thus moved is constant, the angle through which the spindle 6, and therefore the sight bar, is moved depends upon the position occupied by the cam, movement of the spindle being arrested when the feeler arm meets the cam 14. When the lever is returned it first moves idly and then picks up the feeler arm 10 and moves it and the sight bar back to their normal positions. The cam is fast with a crown wheel 18 meshing with a pinion 19 actuated by a hand wheel 20; the pinion 19 also meshes with a second crown wheel 21 fast with a ring 22 graduated in thousands of feet and capable of being read against a fixed pointer 23. Thus by turning the hand wheel 20 the altitude cam 14 can be set to the correct position according to the estimated altitude. On the lever 12 is a finger 24 (see Fig. 6), which, as the lever is moved from either position to the other, turns upon its pivot a lever 25 adapted to start and to stop by well known mechanism a chronograph or stop-watch 26, the hand 27 of which rotates around a dial 28 graduated in miles per hour. 29 is a push rod by means of which the hand of the watch can be re-set; this rod is provided with a milled head 30 and a pinion 31 for winding up the watch.

The casing 17 is not rigidly secured to the fuselage, but is so mounted by means of screws 81 working in slots 82 that it can be leveled by means of a bubble 32 and clamped by a nut 33.

In order to avoid the possibility of any backlash the pinion 19 is made slightly conical and is pressed inward by a spring 34 so that it may always keep in mesh with the two crown wheels.

The tube 4 carries a bearing tube 35 in which is mounted a drift sighting tube 36, the lower end of which is provided with a set of parallel wires 37, while the upper end carries an extension 38 having in it an eccentric slot 39 in which moves a pin 40 on an arm 41 on the top of the sight bar 3.

The method of taking an observation is as follows:—

The observer or pilot levels the instrument and by means of the handle 20 sets the ring 22 until the figure corresponding to the height at which he estimates he is flying is opposite the pointer 23. He then looks through the drift sighting tube 36 and if he finds that the land flow is not parallel to the wires 37, that is, if the machine is drifting owing to a cross wind, he rotates the tube until the wires 37 are parallel to the direction of apparent movement of objects on the ground. This rotation of the tube 36 is transmitted through the slot and pin to the sight bar 3 so that the latter is rotated inside the tube 4 through an angle equal to half the angle through which the tube 36 was turned and in the same direction. This sets the sights 1 and 2 to compensate for drift. He then looks down the sights 1, 2, until he notices a conspicuous object crossing his line of sight, and he then, by means of the handle 13, throws the sight bar over, thus starting the watch, the new position of the sight bar being determined by the feeler coming into contact with the cam 14; directly he observes the object which he has selected again in the line of sight he moves the handle back, so stopping the watch: he is thus enabled to read upon the dial the speed at which he is moving relatively to the ground.

Should he desire to drop a bomb, he turns the hand wheel 20 until the altitude figure on the outer scale 42 of the ring 22 is opposite the figure on the fixed scale 43 which he has just found to be his ground speed. He then moves the lever 12 over to bring the feeler against the cam, thus setting the sight bar in such a position that the instant at which the target comes into the line of sight is the instant at which he should release his bomb in order to strike the target.

When dropping bombs the sights must be set to correct for drift in the same manner as for determining the ground speed. This enables bombs to be dropped without bringing the aeroplane directly into the up or down wind position as is usually the case. The line of motion, however, must as usual be directly over the target.

The accompanying diagram, Fig. 7, seems to explain the working. Let AB be the fore and aft line of the machine on which the instrument is fixed. If the machine is flying either up or down the wind AB will also be the direction of flight. Let AC represent the distance on the ground the time occupied in the passage over which is to give the measure of the speed of the machine. This distance is to be kept constant, assuming of course that the altitude at which the machine is flying does not change. Now suppose there is a side wind and let AD be the course of the machine, the angle BAD which is the angle between the direction of motion and the fore and aft line of the machine being the angle of drift. Draw CE perpendicular to AB and CF perpendicular to AD, then in order that the wires 37 may be set parallel to the land flow they must be turned through the angle ECF=angle BAD. If the sights were turned through the same angle, then the distance measured on the ground would be represented by AF which is shorter than AC, but it is necessary that the distance measured on the ground should remain constant. Let G be a point on AD such that AG=AC, the angle ECG therefore is the angle through which the sight must be turned and this angle ECG being the complement of the angle GCA is equal to half the angle BAD.

What I claim is:—

1. In an instrument for measuring the velocity of a body having movement relative to the instrument, the combination of means forming a movable sight line adapted to be directed upon said body, a stop watch and means controlled by the movement of the first named means for starting and stopping the watch.

2. In means for measuring the velocity of a moving body, the combination of a movable sight, a fixed stop, an adjustable stop, a stop-watch, and means controlled by the movements of the sight as determined by the stops for starting and stopping the watch.

3. In means for measuring the ground speed of an aircraft, the combination of a movable sight, a fixed stop, a stop adapted to be set according to the altitude of the aircraft, a stop-watch, and means controlled by the movements of the sight as determined by the stops for starting and stopping the watch.

4. In means for measuring the ground speed of an aircraft, the combination of a movable sight, a fixed stop, a stop adapted to be set according to the altitude of the aircraft, a stop-watch, means controlled by the movements of the sight as determined by the stops for starting and stopping the watch, and means for correcting for drift.

5. In means for measuring the ground speed of an aircraft, the combination of a movable sight, a fixed stop, a stop adapted to be set according to the altitude of the aircraft, a stop-watch, means controlled by the movements of the sight as determined by the stops for starting and stopping the watch, and means for setting the sight so that it may be used for bomb dropping.

6. In means for measuring the ground speed of an aircraft, the combination of a movable sight, a fixed stop, a stop adapted to be set according to the altitude of the aircraft, a stop-watch, means controlled by the movements of the sight as determined by the stops for starting and stopping the watch, means for correcting for drift, and means for setting the sight so that it may be used for bomb dropping.

7. In means for measuring the ground speed of an aircraft, the combination of a movable sight, a fixed stop, a stop adapted to be set according to the altitude of the aircraft, a stop-watch, means controlled by the movements of the sight as determined by the stops for starting and stopping the watch, a sighting wire movable with the sight and also rotatable, and means whereby the rotation of the sighting wire sets the sight to correct for drift.

8. In means for measuring the ground speed of an aircraft, the combination of a sight rotatable about a horizontal axis, a cam adjustable for altitude, a feeler fast with a spindle and adapted to be moved into contact with the cam, a fixed stop adapted to limit the movements of the sight and feeler in one direction, a stop-watch, and means controlled by the movements of the feeler for starting and stopping the watch.

9. In means for measuring the ground speed of an aircraft, the combination of a sight rotatable about a horizontal axis, a cam adjustable for altitude, a feeler fast with a spindle and adapted to be moved into contact with the cam, a lever capable of movement about the horizontal axis, a spring connection between the feeler and the lever, fixed stops limiting the movement of the lever, a stop-watch, and means actuated by the movement of the lever for starting and stopping the watch.

10. In means for measuring the ground speed of an aircraft, the combination of a sight rotatable about a horizontal axis, a cam adjustable for altitude, a feeler fast with a spindle and adapted to be moved into contact with the cam, a fixed stop adapted to limit the movements of the sight and feeler in one direction, a stop-watch, means controlled by the movements of the feeler for starting and stopping the watch, a sighting wire movable with the sight about the horizontal axis and also rotatable and means whereby the rotation of the sighting wire sets the sight to correct for drift.

11. In means for measuring the ground speed of an aircraft, the combination of a sight rotatable about a horizontal axis, a cam adjustable for altitude, a feeler fast with a spindle and adapted to be moved into contact with the cam, a lever capable of movement about the horizontal axis, a spring connection between the feeler and the lever, fixed stops limiting the movement of the lever, a stop-watch, means actuated by the movement of the lever for starting and stopping the watch, a sighting wire movable with the sight about the horizontal axis and also rotatable, and means whereby the rotation of the sighting wire sets the sight to correct for drift.

12. In means for measuring the ground speed of an aircraft, the combination of a sight rotatable about a horizontal axis, a cam adjustable for altitude, a feeler fast with a spindle and adapted to be moved into contact with the cam, a fixed stop adapted to limit the movements of the sight and feeler in one direction, a stop-watch, means controlled by the movements of the feeler for starting and stopping the watch, and means for setting the altitude cam according to the speed indicated by the watch.

13. In means for measuring the ground speed of an aircraft, the combination of a sight rotatable about a horizontal axis, a cam adjustable for altitude, a feeler fast with a spindle and adapted to be moved into contact with the cam, a lever capable of movement about the horizontal axis, a spring connection between the feeder and the lever, fixed stops limiting the movement of the lever, a stop-watch, means actuated by the movement of the lever for starting and stopping the watch, a sighting wire movable with the sight about the horizontal axis and also rotatable, means whereby the rotation of the sighting wire sets the sight to correct for drift, and means for setting the altitude cam according to the speed indicated by the watch.

14. In means for measuring the ground speed of an aircraft, the combination of a movable sight, a fixed stop, a stop adapted to be set according to the altitude of the aircraft, a stop-watch having its dial graduated in velocities, means controlled by the movements of the sight as determined by the stops for starting and stopping the watch, and means for correcting for drift.

In testimony that I claim the foregoing as my invention, I have signed my name this 21st day of June, 1918.

NATHANIEL HARVEY HUNT.